//‍

United States Patent [19]

Moll et al.

[11] 4,226,466
[45] Oct. 7, 1980

[54] TRUCK, ESPECIALLY A LARGE CAPACITY VEHICLE OR TRACTOR SEMI-TRAILER COMBINATION

[75] Inventors: Hans Moll, Augsburg; Klaus Flesche, Wiesbaden, both of Fed. Rep. of Germany

[73] Assignee: Maschinenfabrik Augsburg-Nürnberg Aktiengesellschaft, Nürnberg, Fed. Rep. of Germany

[21] Appl. No.: 946,790

[22] Filed: Sep. 28, 1978

[30] Foreign Application Priority Data

Sep. 12, 1977 [DE] Fed. Rep. of Germany ....... 2741125

[51] Int. Cl.³ ............................................. B62D 27/00
[52] U.S. Cl. ............................. 296/190; 180/89.13
[58] Field of Search ................... 296/190; 180/89.13, 180/89.16

[56] References Cited

U.S. PATENT DOCUMENTS

| | | | |
|---|---|---|---|
| 2,798,568 | 7/1957 | Zeller | 180/89.16 |
| 3,885,643 | 5/1975 | Goodbary | 296/190 |

*Primary Examiner*—John J. Love
*Assistant Examiner*—John A. Carroll
*Attorney, Agent, or Firm*—Becker & Becker

[57] ABSTRACT

A truck, especially a large capacity vehicle or tractor semi-trailer combination including a motor-steering unit, which essentially includes the motor, the transmission, the axles, the wheels, and where applicable, a fifth wheel for a semi-trailer; a payload carrier or semi-trailer; and at least one vehicle control cab. The vehicle control cab and other additional structures respectively form separate units which are arranged on top of one another in any desired order and are firmly interconnected. The lowermost respective unit may be mounted on the motor-steering unit.

10 Claims, 8 Drawing Figures

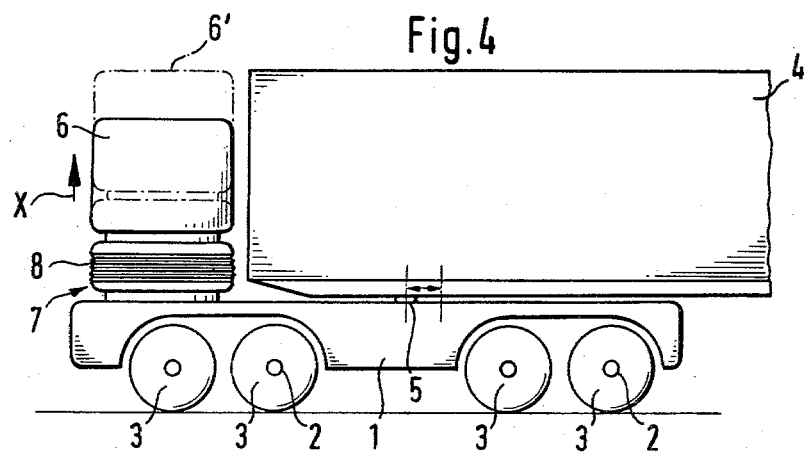
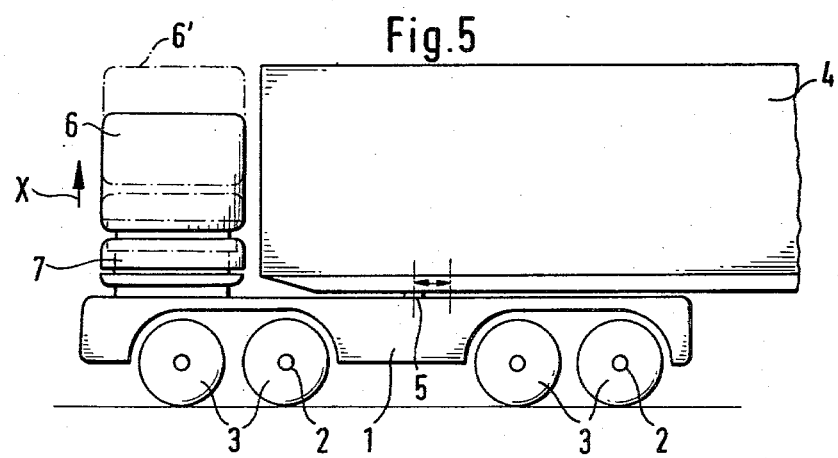
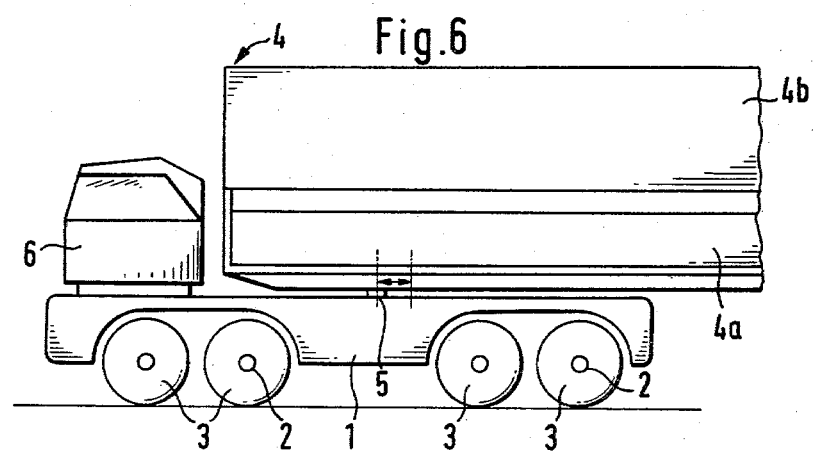

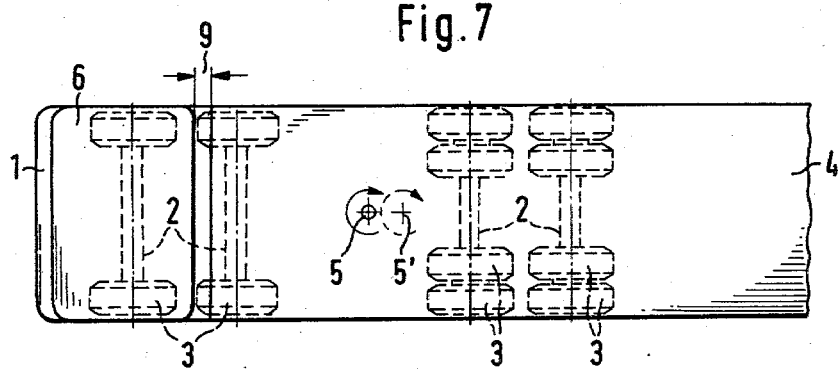
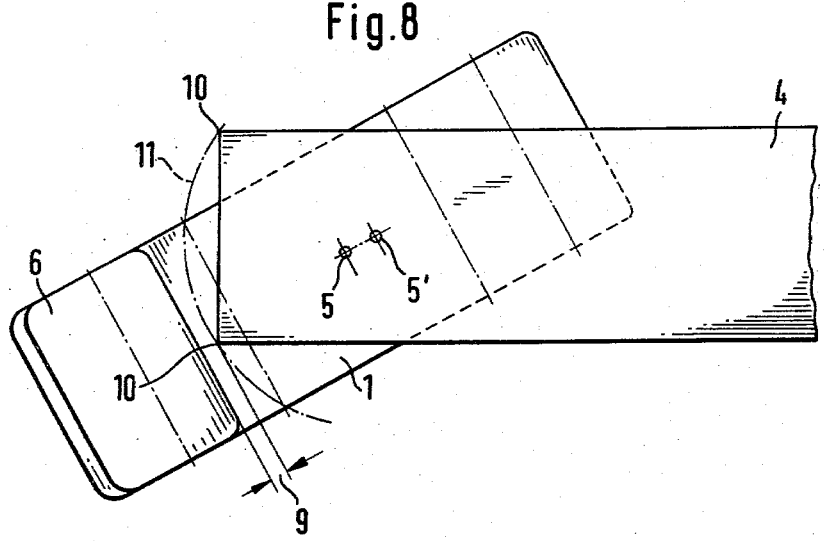

TRUCK, ESPECIALLY A LARGE CAPACITY VEHICLE OR TRACTOR SEMI-TRAILER COMBINATION

The present invention relates to a truck, especially a large capacity vehicle or tractor semi-trailer combination comprising a motor-steering unit, which essentially includes the motor, the transmission, the axles, the wheels, and where applicable a fifth wheel, turntable, or pivot coupling gear for a semi-trailer; a payload carrier, or semi-trailer; and at least one vehicle control cab.

BACKGROUND OF THE INVENTION

With the heretofore known trucks, the vehicle control cab is exactly tailored to the respective motor-steering unit, practically forming an integral unit therewith. If a different vehicle control cab, for example for military purposes or a large capacity cab having a resting or sleeping cabin, is desired, then each specific case requires considerable structural modifications, at least of the entire front of the vehicle, all at substantial cost.

If, as mentioned above, additional resting or sleeping cabins are required, especially on large capacity vehicles and tractor semi-trailer combinations, the additional cabins have up to now been arranged in the vehicle control cab behind the driver's seat directly above the seat backs. This increases the length of the control cab by at least 70 to 80 cm, which in turn causes a loss of the useful length of the vehicle.

The height of the vehicle, on the other hand, is determined by the payload carrier or the semi-trailer, and often amounts to as much as four meters. In comparison, the heretofore known large capacity cabs have a height which is about 1 meter less than the height of the payload carrier or semi-trailer. In other words, the height of the vehicle is poorly utilized. Moreover, unfavorable aerodynamic conditions occur.

OBJECT OF THE INVENTION

It is therefore an object of the present invention to improve the design and construction of a truck of the above mentioned general type in such a way as to eliminate the previously mentioned drawbacks, namely so that a motor-steering unit may be provided with various additional structures at relatively little expense, at the same time being able to provide a maximum useful length and to improve the aerodynamic conditions.

This object and other objects and advantages of the present invention will appear more clearly from the following specification in connection with the accompanying drawings, in which:

BRIEF DESCRIPTION OF DRAWINGS

FIGS. 1-6 are side views of tractor semi-trailer combinations according to the present invention with different units, the semi-trailers being shown only partially;

FIG. 7 is a top view of the tractor semi-trailer combination of FIG. 2 shown when driving straight ahead, and FIG. 8 is a top view of the tractor semi-trailer combination of FIG. 2 shown when turning or negotiating curves.

BRIEF SUMMARY OF THE INVENTION

Figure 1:
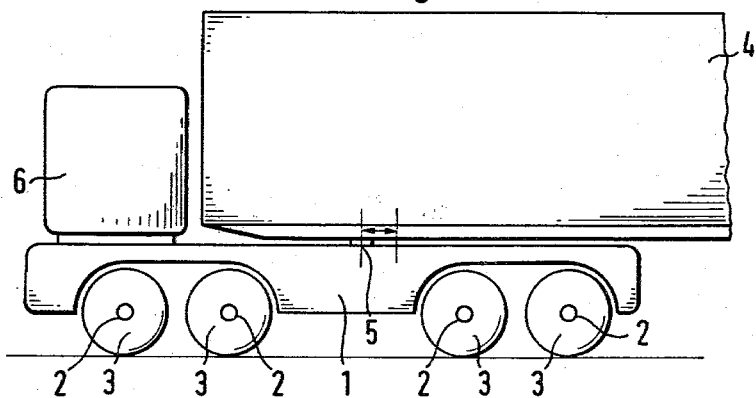

The truck of the present invention is characterized primarily in that the vehicle control cab and the other additional structures respectively form separate units, in that the individual units are arranged in any desired order on top of one another and are firmly connected to one another, and in that the lowest unit in each case may be mounted on the motor-steering unit.

With this configuration, it is possible to conveniently mount any special structure, or even a plurality of structures at the same time, on the same motor-steering unit. Stacking the structures on top of one another results in a shortening of the structural length, and consequently, an increase in the useful length. In addition, the height of the vehicle is better utilized and, as a result, the aerodynamic conditions are also improved. Thus, the object of the present invention is fully realized.

In order to design the vehicle more aerodynamically, it is further proposed according to the present invention that the vehicle control cab and additional structures be arranged as close as possible to the payload carrier or to the front of the semi-trailer. The distance between the two sections should not exceed 100 mm.

This is not readily possible with the heretofore known tractor semi-trailer combinations, because when turning or negotiating curves, the front corners of the semi-trailer or container have to clear the control cab and the other structures. In order to overcome this problem, it is proposed according to the present invention that the fifth wheel, turntable, or pivot coupling gear, on which the semi-trailer is rotatably supported, be mounted on the motor-steering unit in such a way as to permit a limited sliding movement in the direction of the longitudinal axis of the vehicle. An automatically operated device, which is not a part of the present invention, shifts the fifth wheel, and consequently the semi-trailer, as close as possible to the vehicle control cab and the additional structures during fast or straight ahead driving, so that the gap between them is reduced to a minimum. When turning or negotiating curves, however, the fifth wheel is shifted toward the rear, resulting in a clearance between the vehicle cab and the semi-trailer or container carrier which is great enough that the corners of the latter are able to swing out toward either side without difficulty.

An essential additional structure is the resting or sleeping cabin. Pursuant to the present invention, such a cabin may be arranged either above or below the vehicle control cab. Expediently, the cabin is designed in such a way that it can telescope vertically or be extended by means of bellows. Naturally, appropriate steps and/or passages or ladders through the interior of the cabins would be provided to give access to the individual structures in accordance with the specific configuration adopted.

DETAILED DESCRIPTION

Referring now to the drawings in detail, identical reference numerals in the figures indicate identical parts.

Referring to FIGS. 1-6, the motor-steering unit is designated with the reference numeral 1. On or in this unit 1, but omitted for the sake of simplicity, are located the motor, the transmission, and the remaining drive and steering parts. The axles 2, on which are mounted the wheels 3, are also connected to the motor-steering unit 1. The semi-trailer 4, as will be described in detail subsequently, can be pivoted by means of a fifth wheel, turntable, or pivot coupling gear 5 and is connected to the motor-steering unit 1 in such a way as to be shiftable in the direction of the longitudinal axis of the vehicle.

Figure 2:
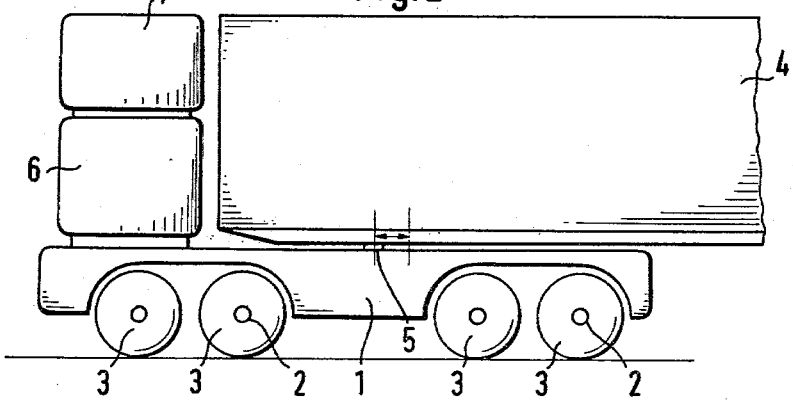

As shown in FIG. 1, only a vehicle control cab 6 is mounted on the front part of the motor-steering unit 1. In FIG. 2, a resting or sleeping cabin 7 is provided above and connected to the vehicle control cab 6, resulting in a overall height which is approximately equal to the height of the semi-trailer or container carrier 4. The means of access to and passage through the sleeping cabin 7 are not shown and may be of any desired type, e.g. by a foldable ladder.

Figure 3:
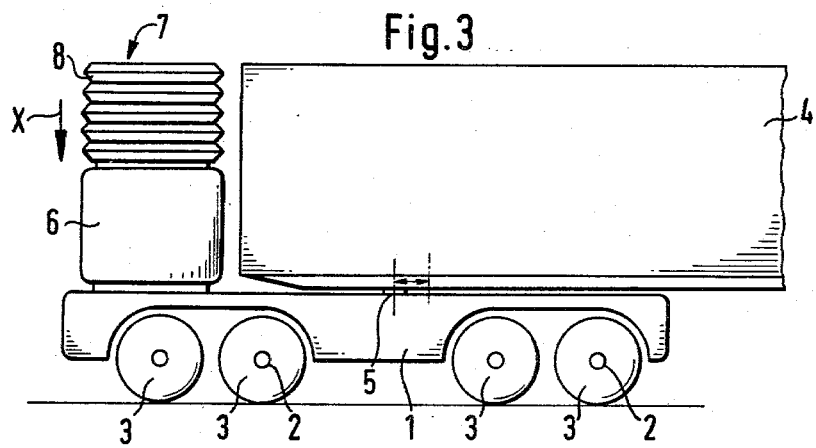

In FIG. 3, a sleeping cabin 7 is also arranged above the vehicle control cab 6. However, the sleeping cabin 7 comprises a bellows 8, by means of which the cabin 7 can be collapsed downwardly in the direction of the arrow X. The structure 7 may, of course, also be used for other purposes, and need not necessarily serve only as a sleeping cabin.

In FIG. 4, the sleeping cabin 7, which comprises a bellows 8, is mounted on the motor-steering unit 1 in the collapsed state, and the vehicle control cab 6 is arranged on top of the cabin 7. The dash-dot lines 6' indicate the position of the vehicle control cab 6 when the bellows 8 is extended in the direction of the arrow X.

FIG. 5 shows the same arrangement as in FIG. 4, except that the sleeping cabin 7 can be telescopically extended.

FIG. 6 shows a special type vehicle, such as would be used, for instance, for military purposes, transport of rocks, etc. The vehicle control cab 6 is designed completely differently, and the semi-trailer 4 comprises a flat frame 4a and a cover or tarpaulin 4b which is stretched over it.

FIG. 7 shows how the gap 9 between the vehicle control cab 6 and the front of the semi-trailer 4 is only very small when the vehicle is driven straight ahead, because the turntable 5 on the motor-steering unit 1 is in its forwardmost position. The position 5', which is indicated by a cross, marks the rearmost position of the fifth wheel 5. As shown in FIG. 8, the fifth wheel 5 is shifted into this position 5' when the tractor semi-trailer makes a turn. In so doing, the gap 9 is increased in such a way that it attains its normal width only when one of the front corners 10 of the semi-trailer 4 is laterally swung out to such an extent that the other front corner is approximately in the center of the back of the forward structures, as indicated by the circular line 11. Thus, shifting of the fifth wheel 5 between the positions 5 and 5' results in good aerodynamic conditions during the straight-ahead driving, while enabling maximum rotation without difficulty when negotiating curves.

In the same manner as described above, it is possible to mount passenger carriers, i.e., bus bodies, so that a complete system is provided.

The present invention is, of course, in no way restricted to the specific showing of the drawings, but also encompasses any modifications within the scope of the appended claims.

What we claim is:

1. A truck, especially large capacity vehicles and tractor semi-trailer combinations, comprising in combination:

a motor-steering unit;

a payload carrier connected to said motor-steering unit;

at least one lower vehicle control cab secured to said motor-steering unit; and at least one additional upper expandable and foldable cab structure variable in height adaptable to height of said payload carrier for reduction of air resistance, said at least one lower vehicle control cab and said at least one additional upper structure respectively being in the form of separate interconnected units arranged on top of one another, the lowermost respective unit being mountable on said motor-steering unit.

2. A truck in combination according to claim 1, in which said at least one lower control cab and said at least one additional upper structure are arranged as close as possible to said payload carrier.

3. A truck in combination according to claim 2, in which said at least one lower control cab and said at least one additional upper structure are arranged less than 100 mm from said payload carrier.

4. A truck in combination according to claim 1, which includes a fifth wheel operatively connected to said motor-steering unit for shifting said payload carrier to a limited extent along the longitudinal axis of said truck.

5. A truck in combination according to claim 4, in which said fifth wheel is automatically shiftable toward said at least one lower vehicle control cab and said at least one additional upper structure when said truck is driven straight ahead, and in the opposite direction when negotiating curves.

6. A truck in combination according to claim 1, in which said at least one additional upper structure is a resting and sleeping cabin.

7. A truck in combination according to claim 6, in which said at least one additional upper structure is vertically and telescopically extensible.

8. A truck in combination according to claim 6, in which said at least one additional upper structure is in the form of a bellows and is vertically extensible.

9. A tractor-semi-trailer combination, comprising a chassis, a fifth wheel connection on said chassis, a payload carrier connected to said chassis by means of said fifth wheel connection, said chassis including the engine, transmission, and axles and two separate cabins, one of said cabins being a control cab and the other of said cabins being a sleeping cab, said two cabins being arranged on top of one another with the uppermost cabin being expansible and the lowermost cabin being rigid, characterized in that one of said cabins is in the form of a bellows having volume thereof variable by extending or collapsing the bellows in a vertical direction.

10. A tractor-semi-trailer combination according to claim 9 characterized in that means are provided whereby said fifth wheel connection is shiftable in longitudinal direction as a function of the vehicle speed.

* * * * *